(12) United States Patent
Murayama et al.

(10) Patent No.: US 7,804,205 B2
(45) Date of Patent: Sep. 28, 2010

(54) ELECTRET DEVICE AND ELECTROSTATIC OPERATING APPARATUS

(75) Inventors: Yoshiki Murayama, Anpachi-gun (JP); Naoteru Matsubara, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 156 days.

(21) Appl. No.: 11/928,475

(22) Filed: Oct. 30, 2007

(65) Prior Publication Data

US 2008/0100148 A1    May 1, 2008

(30) Foreign Application Priority Data

Oct. 30, 2006    (JP)    ............... 2006-293646

(51) Int. Cl.
G11C 13/02    (2006.01)
H01L 23/58    (2006.01)
(52) U.S. Cl. .................. 307/400; 257/651
(58) Field of Classification Search ........ 307/400; 257/297, 651
See application file for complete search history.

(56) References Cited

U.S. PATENT DOCUMENTS 6,144,106 A * 11/2000 Bearinger et al. ........ 257/789
7,449,811 B2 * 11/2008 Suzuki et al. ............ 310/309

FOREIGN PATENT DOCUMENTS

| JP | 7-176211 | 7/1995 |
| JP | 2005-333716 | 12/2005 |
| JP | 2006-180450 A | 7/2006 |

OTHER PUBLICATIONS

Takahashi Masaya, Method of Manufacturing Electret Film for Electrostatic Actuator, JP Pub No. 2005-333716), see attached English machine translation.*
Japanese Office Action, 2006-293646, Nov. 18, 2008, pp. 1-8, Japan.

* cited by examiner

*Primary Examiner*—Michael Rutland Wallis
(74) *Attorney, Agent, or Firm*—Ditthavong, Mori & Steiner, P.C.

(57) ABSTRACT

An electret device includes an electret film capable of storing charges and a charge outflow inhibition film formed on an upper surface of a region having a high charge density in the electret film and inhibiting the charges stored in the electret film from flowing out.

6 Claims, 11 Drawing Sheets

ELECTRET DEVICE AND ELECTROSTATIC OPERATING APPARATUS

BACKGROUND OF THE INVENTION

1. Field of the Invention

The present invention relates to an electret device and an electrostatic operating apparatus, and more particularly, it relates to an electret device capable of storing charges and an electrostatic operating apparatus comprising the electret device.

2. Cross-Reference to Related Applications

The priority application number JP2006-293646, Electret Device and Electrostatic Operating Apparatus, Oct. 30, 2006, Yoshiki Murayama, Naoteru Matsubara, upon which this patent application is based is hereby incorporated by reference.

3. Description of the Background Art

An electret film (electret device) capable of storing charges is known in general. In a conventional electret film, a patterned antistatic member is arranged between a discharge electrode and an electret material (electret film) at the time of charge injection into the electret material due to corona discharge, whereby only a region corresponding to the pattern of the antistatic member is charged.

SUMMARY OF THE INVENTION

An electret device according to a first aspect of the present invention comprises an electret film capable of storing charges and a charge outflow inhibition film formed at least on an upper surface of a high charge density region of the electret film and inhibiting the charges stored in the electret film from flowing out.

An electrostatic operating apparatus according to a second aspect of the present invention comprises a fixed electrode, a movable electrode capable of moving with respect to the fixed electrode, so provided as to be opposed to the fixed electrode at a prescribed distance, an electret device formed on an upper surface of either the fixed electrode or the movable electrode, and including an electret film capable of storing charges and a charge outflow inhibition film formed at least on an upper surface of a high charge density region of the electret film and inhibiting the charges stored in the electret film from flowing out.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the drawings.

First Embodiment

A structure of an electret device 10 according to a first embodiment of the present invention will be now described with reference to FIGS. 1 and 2.

Figure 1:
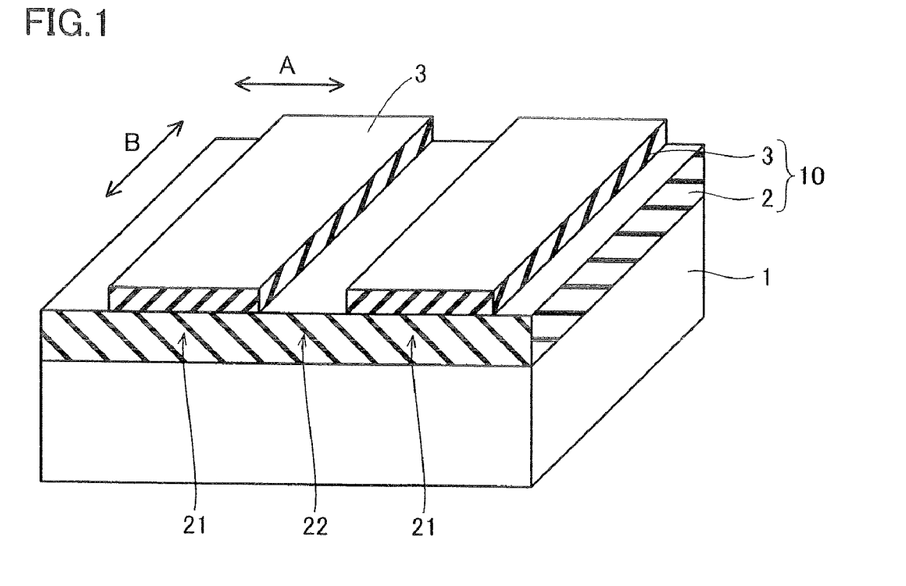
FIG. 1 is a perspective view showing a structure of an electret device according to a first embodiment of the present invention.
Figure 2:
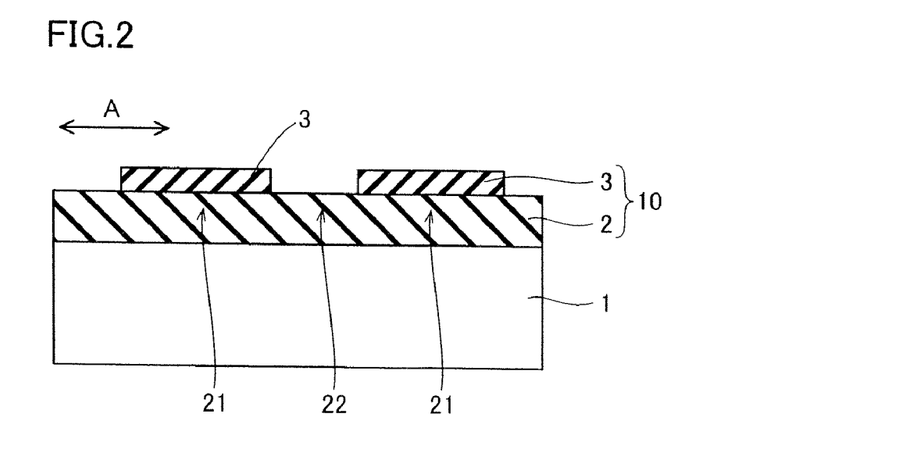
FIG. 2 is a sectional view showing the structure of the electret device according to the first embodiment shown in FIG. 1.

The electret device 10 according to the first embodiment is formed on an upper surface of a substrate 1 made of glass having a thickness of about 300 μm to about 1000 μm as shown in FIGS. 1 and 2. This electret device 10 is constituted by an electret film 2 and charge outflow inhibition films 3 for inhibiting charges stored in the electret film 2 from flowing out.

According to the first embodiment, the electret film 2 of the electret device 10 is formed on the upper surface of the substrate 1. This electret film 2 consists of $SiO_2$ and has a thickness of about 0.1 μm to about 100 μm. Regions 21 of the electret film 2, located under regions where the charge outflow inhibition films 3 are formed each have a high charge density, while regions 22 of the electret film 2, located under regions where the charge outflow inhibition films 3 are not formed each have a low charge density. The regions 21 and 22 are examples of the "high charge density region" and the "low charge density region" in the present invention respectively.

According to the first embodiment, a plurality of the charge outflow inhibition films 3 of the electret device 10 are formed on an upper surface of the electret film 2 at prescribed intervals along arrow A. Each of the charge outflow inhibition films 3 is so formed as to extend along arrow B. Each charge outflow inhibition film 3 consists of MSQ (Methyl Silses Quioxane) or SiOC and has a thickness of about 0.01 μm to about 10 μm.

A manufacturing process of the electret device 10 according to the first embodiment of the present invention will be described with reference to FIGS. 2 to 4.

First, the electret film 2 of $SiO_2$ is formed on the upper surface of the substrate 1 by thermal oxidation. A MSQ film of a SiOC film is formed on the upper surface of the electret film 2. In the case of forming the MSQ film, spin coating is employed, while in the case of forming the SiOC film, PE-CVD (plasma enhanced chemical vapor deposition) is employed. Thereafter the charge outflow inhibition films 3 of MSQ or SiOC patterned as shown in FIG. 2 are formed by photolithography and etching.

Figure 3:
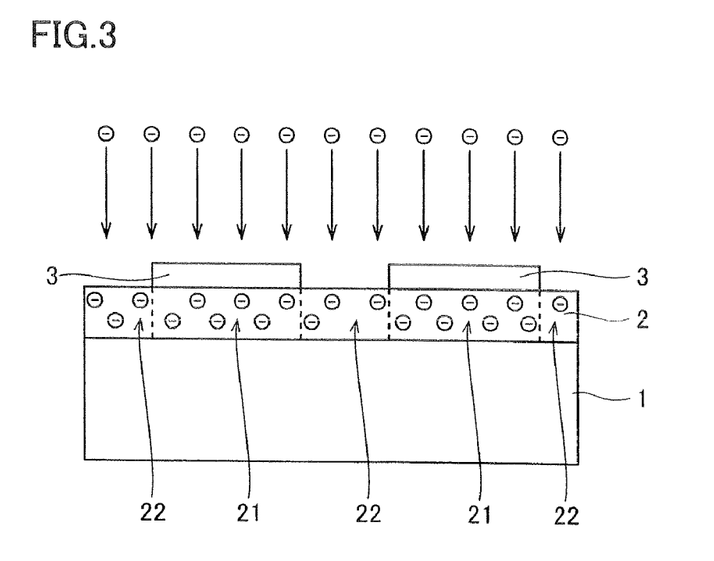
FIGS. 3 and 4 are sectional views for illustrating a process of manufacturing the electret device according to the first embodiment shown in FIG. 1.
Figure 4:
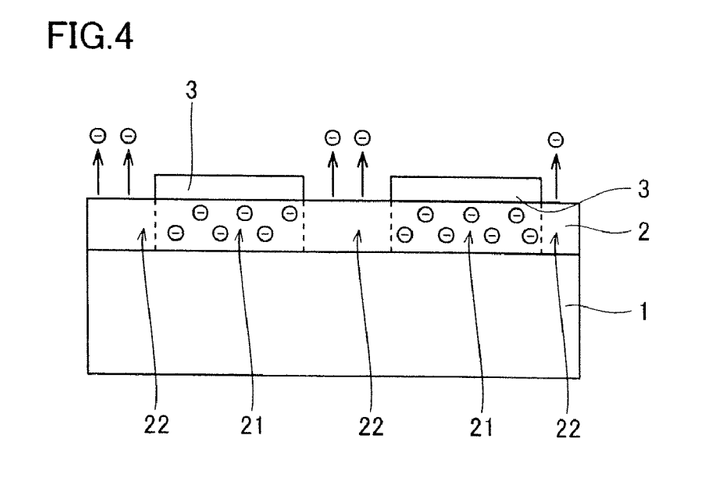

As shown in FIG. 3, charges are injected into the electret film 2. More specifically, energy due to an electric field is given to charges generated by corona discharge, whereby the charges are injected to the regions 21 and 22 of the electret film 2. After injection of the charges, the charges injected into the regions 21 located under the regions where the charge outflow inhibition films 3 are formed are stored, while the charges injected into the regions 22 located under the regions where the charge outflow inhibition films 3 are not formed flow out, as shown in FIG. 4. Thus, the regions 21 each have a high charge density, while the regions 22 each have a low charge density, as shown in FIG. 2.

According to the first embodiment, as hereinabove described, the charge outflow inhibition films 3 inhibiting the charges stored in the electret film 2 from flowing out are provided on the upper surface of the electret film 2, whereby the charges injected into the regions 21 of the electret film 2, located under the regions where the charge outflow inhibition films 3 are formed can be inhibited from flowing out from the upper surface of the electret film 2. Therefore, the regions 21 each having a high charge density can be formed under the regions where the charge outflow inhibition films 3 are formed. On the other hand, the charges injected into the regions 22 of the electret film 2, located under the regions where the charge outflow inhibition films 3 are not formed flow out from the upper surface of the electret film 2 and hence the regions 22 each having a low charge density can be formed under the region where the charge outflow inhibition films 3 are not formed. Thus, the regions 21 each having a high charge density and the regions 22 each having a low charge density can be formed by employing the charge outflow inhibition films 3 and hence no antistatic member may be provided between a discharge electrode and the electret film at the time of charge injection. Therefore it is possible to inhibit charges from being disadvantageously likely to be injected into the antistatic members having a higher potential than the potential of the electret film, dissimilarly to a case where a plurality of regions having different charge densities are formed by employing the antistatic members at the time of charge injection. Consequently, injection of charges into the electret film 2 can be inhibited from becoming difficult and hence the amount of charges injected into the electret film 2 can be increased. The charge outflow inhibition films 3 are formed on the upper surface of the electret film 2, whereby the regions 21 each having a high charge density and the regions 22 each having a low charge density can be formed without patterning the electret film 2 and hence the disadvantage that charges are unlikely to be injected into the electret film due to a transverse electric field generated by the patterned electret film at the time of charge injection does not occur. The amount of charges injected into the electret film 2 can be increased also by this. Thus, the regions 21 of the electret film 2, located under the regions where the charge outflow inhibition films 3 are formed can have a higher charge density, and hence the electret device 10 having the regions 21 each having a high charge density and the regions 22 each having a low charge density due to the charge outflow inhibition films 3 and having large difference between the charge densities can be obtained.

An experiment conducted for confirming the aforementioned effect of the charge outflow inhibition films according to the first embodiment will be now described. In this experiment, the following samples 1 to 5 were prepared. More specifically, in order to confirm the charge outflow inhibiting effect of the charge outflow inhibition films, an electret device according to the sample 1 corresponding to the aforementioned first embodiment, constituted by forming charge outflow inhibition films of MSQ each having a thickness of 0.3 μm on an upper surface of an electret film of $SiO_2$ having a thickness of 1 μm, and an electret device according to the sample 4 corresponding to the aforementioned first embodiment, constituted by forming charge outflow inhibition films of SiOC each having a thickness of 0.3 μm on an upper surface of an electret film of $SiO_2$ having a thickness of 1 μm were prepared. The sample 2 according to a comparative example, constituted by an electret film of $SiO_2$ having a thickness of 1 μm was prepared. The sample 3 according to a comparative example, constituted by a charge outflow inhibition film of MSQ having a thickness of 0.3 μm and the sample 5 according to a comparative example, constituted by a charge outflow inhibition film of SiOC having a thickness of 1 μm were prepared. The charge outflow inhibition films consisting of MSQ of the samples 1 and 3 were formed by spin coating, the electret films consisting of $SiO_2$ of the sample 1, 2 and 4 were formed by thermal oxidation, and the charge outflow inhibition films consisting of SiOC of the samples 4 and 5 were formed by PE-CVD. The electret films and the charge outflow inhibition films of the samples 1 to 5 were not patterned. Charge injection was performed with respect to the prepared samples 1 to 5, and variation with time of the surface potentials of the samples 1 to 5 to which the charge injection was performed was measured. Results thereof are shown in FIGS. 5 and 6.

Figure 5:
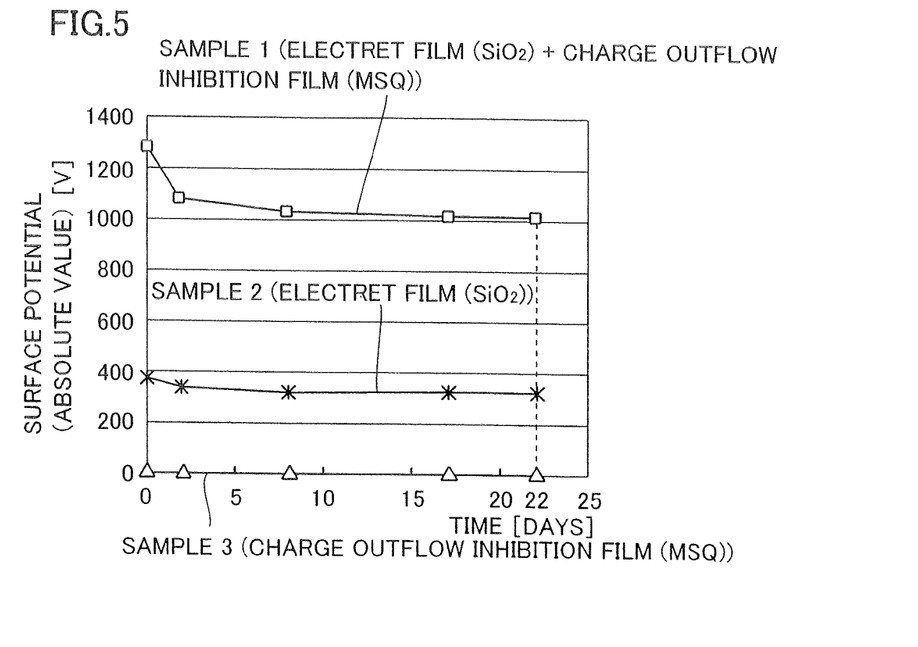
FIG. 5 is a graph showing the relation between surface potentials and times in samples 1 to 3.

From the measurement results shown in FIG. 5, after a lapse of 22 days, the surface potential of the electret device according to the sample 1 corresponding to the aforementioned first embodiment, constituted by forming the charge outflow inhibition films of MSQ on the upper surface of the electret film of $SiO_2$ was about −1020 V. After a lapse of 22 days, the surface potential of the sample 2 according to the comparative example, constituted by the electret film of $SiO_2$ was about −330 V, and the surface potential of the sample 3 according to the comparative example, constituted by the charge outflow inhibition film of MSQ was about 0 V.

Figure 6:
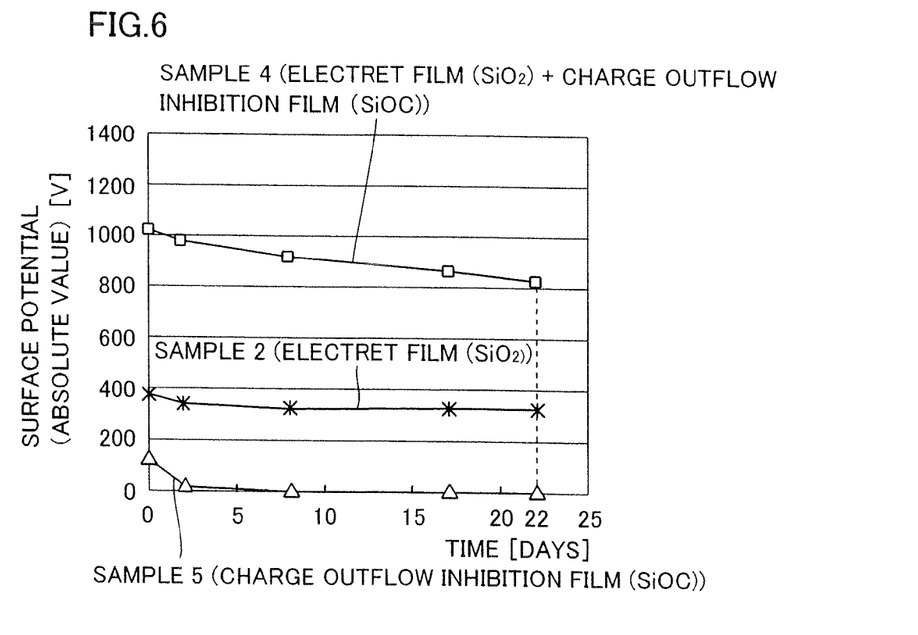
FIG. 6 is a graph showing the relation between surface potentials and times in samples 2, 4 and 5.

From the measurement results shown in FIG. 6, after a lapse of 22 days, the surface potential of the electret device according to the sample 4 corresponding to the aforementioned first embodiment, constituted by forming the charge outflow inhibition films of SiOC on the upper surface of the electret film of $SiO_2$ was about −811 V. After a lapse of 22 days, the surface potential of the sample 2 according to the comparative example, constituted by the electret film of $SiO_2$ was about −330 V, and the surface potential of the sample 5 according to the comparative example, constituted by the charge outflow inhibition film of SiOC was about 0 V.

It has been proved from the aforementioned measurement results that the surface potential of the electret device is increased by forming the charge outflow inhibition films on the upper surface of the electret film as in the samples 1 and 4. This is conceivably because the charge outflow inhibition films formed on the upper surface of the electret film inhibit charges injected into the electret film from flowing out. It has been further proved that difference between the surface potential of the sample 1 or 4 constituted by forming the charge outflow inhibition films on the upper surface of the electret film and the surface potential of the sample 2 constituted by the electret film is larger than the surface potential of the sample 2 constituted by the electret film. Therefore, it has been proved that the charge outflow inhibition films can increase difference between charge densities in the electret film in a case where the regions each having a high charge density and the regions each having a low charge density are formed in the electret film as compared with a case where regions into which charges are injected and regions into which charges are not injected are formed in the electret film with employing no charge outflow inhibition film. It has been proved from the aforementioned results of the samples 3 and 5 that charges are not stored in the charge outflow inhibition films.

An experiment conducted for confirming influence by the thickness of the electret film according to the aforementioned first embodiment will be now described. In this experiment, in order to confirm the influence by the thickness of the electret film, an electret device according to a sample 6, constituted by forming charge outflow inhibition films each having a thickness of 0.3 μm on an upper surface of an electret film having a thickness of 0.5 μm, an electret device according to a sample 7, constituted by forming charge outflow inhibition films each having a thickness of 0.3 μm on an upper surface of an electret film having a thickness of 0.8 μm, and an electret device according to a sample 8, constituted by forming charge outflow inhibition films each having a thickness of 0.3 μm on an upper surface of an electret film having a thickness of 1 μm were prepared. In the samples 6 to 8, $SiO_2$ formed by thermal oxidation was employed as the electret films and SiOC formed by PE-CVD was employed as the charge outflow inhibition films. The electret films and the charge outflow inhibition films of the samples 6 to 8 were not patterned. Charge injection was performed with respect to the prepared samples 6 to 8, and the surface potentials of the samples 6 to 8 to which the charge injection was performed were measured. Results thereof are shown in FIG. 7.

Figure 7:
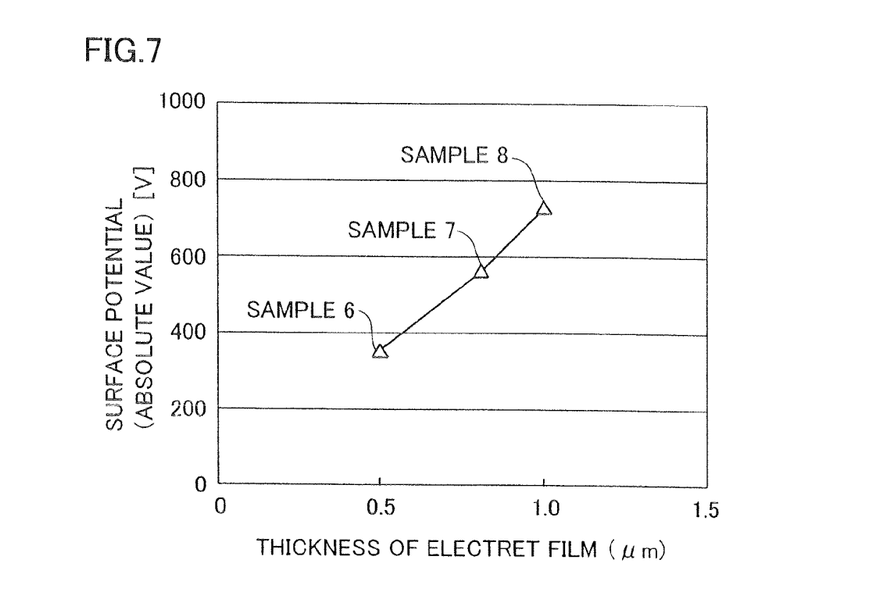
FIG. 7 is a graph showing the relation between the thicknesses of the electret films and the surface potentials.

From the measurement results shown in FIG. 7, the surface potential of the electret device according to the sample 6 employing the electret film having a thickness of 0.5 μm was about −362 V, the surface potential of the electret device according to the sample 7 employing the electret film having a thickness of 0.8 μm was about −575 V, and the surface potential of the electret device according to the sample 8 employing the electret film having a thickness of 1 μm was about −741 V. It has been proved from the aforementioned measurement results that increase in the thickness of the electret film increases the surface potential of the electret device in the structure where the charge outflow inhibition films are formed on the upper surfaces of the electret film.

Second Embodiment

Figure 8:
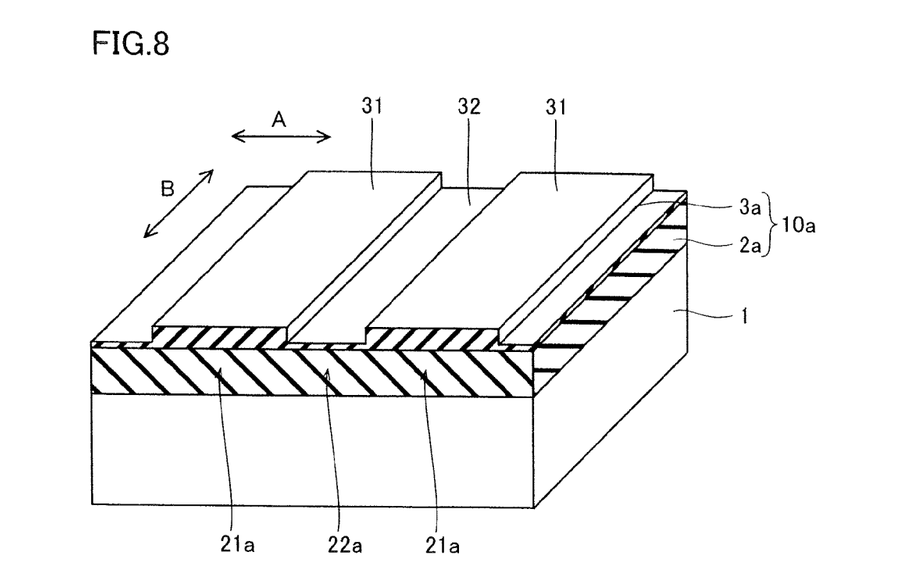
FIG. 8 is a perspective view showing a structure of an electret device according to a second embodiment of the present invention.
Figure 9:
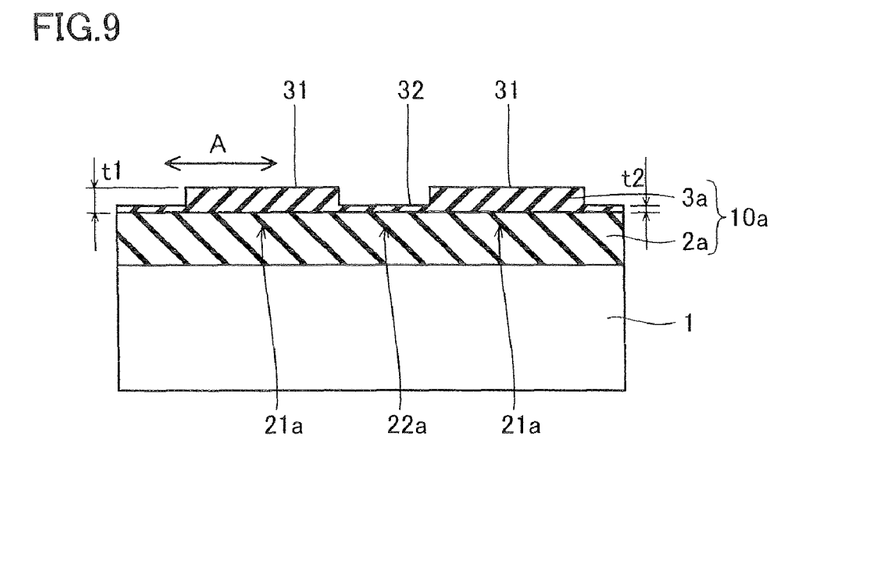
FIG. 9 is a sectional view showing the structure of the electret device according to the second embodiment shown in FIG. 8.

Referring to FIGS. 8 and 9, in an electret device 10*a* according to a second embodiment, a charge outflow inhibition film 3*a* is formed also on upper surfaces of regions 22*a* of an electret film 2*a*, each having a low charge density, dissimilarly to the aforementioned first embodiment.

The electret device 10*a* according to the second embodiment is formed on an upper surface of a substrate 1 made of glass having a thickness of about 300 μm to about 1000 μm as shown in FIGS. 8 and 9. This electret device 10*a* is constituted by the electret film 2*a* and the charge outflow inhibition film 3*a* for inhibiting charges stored in the electret film 2*a* from flowing out.

According to the second embodiment, the charge outflow inhibition film 3*a* of the electret device 10*a* consists of $SiO_2$ and is formed on an overall upper surface of the electret film 2*a* having a thickness of about 0.1 μm to about 100 μm. The charge outflow inhibition film 3*a* consists of MSQ or SiOC. The charge outflow inhibition film 3*a* is formed with a plurality of projecting portions 31 each having a thickness t1 (about 0.01 μm to about 10 μm) at prescribed intervals along arrow A. Each projecting portion 31 is so formed as to extend along arrow B. Recess portions 32 each having a thickness t2 (about 0.01 μm to about 5 μm) smaller than the thickness t1 are formed between the projecting portions 31. Each projecting portion 31 and each recess portion 32 are examples of the "first charge outflow inhibition portion" and the "second charge outflow inhibition portion" in the present invention respectively. The thicknesses t1 and t2 are examples of the "first thickness" and the "second thickness" in the present invention respectively.

According to the second embodiment, the electret film 2*a* includes regions 21*a* each having a high charge density located under the projecting portions 31 of the charge outflow inhibition film 3*a* and the regions 22*a* each having a low charge density located under the recess portions 32 of the charge outflow inhibition film 3*a*. The regions 21*a* and 22*a* are examples of the "high charge density region" and the "low charge density region" in the present invention respectively.

A manufacturing process of the electret device 10*a* according to the second embodiment are similar to that of the electret device according to the aforementioned first embodiment, except for a process of forming the charge outflow inhibition film 3*a*. The charge outflow inhibition film 3*a* of MSQ or SiOC according to the second embodiment is formed by forming a MSQ film or a SiOC film on the overall upper surface of the electret film 2*a* similarly to the electret device according to the first embodiment and thereafter etching prescribed portions of the MSQ film or the SiOC film by a prescribed thickness by photolithography and etching.

According to the second embodiment, as hereinabove described, the charge outflow inhibition film 3*a* including the projecting portions 31 having the thickness t1 and the recess portions 32 having the thickness t2 is provided, whereby the outflow amount of charges injected into the regions 21*a* of the electret film 2*a* corresponding to the projecting portions 31 can be reduced as compared with the outflow amount of charges injected into the regions 22*a* corresponding to the recess portions 32. Thus, the charge density of each region 21*a* can be increased as compared with that of each region 22*a* and hence a plurality of the regions 21*a* and 22*a* having different charge densities can be easily formed. The recess portions 32 of the charge outflow inhibition film 3*a* can inhibit charges from flowing out from the upper surfaces of the regions 22a of the electret film 2a corresponding to the recess portions 32 at the time of charge injection, and hence inequality of the charge density in the electret film 2a at the time of charge injection can be inhibited from occurring. Therefore, charges can be likely to be injected into the regions 21a of the electret film 2a corresponding to the projecting portions 31. Consequently, the regions 21a of the electret film 2a each having a higher charge density than the regions 21 of the electret film 2 according to the aforementioned first embodiment can be formed.

The remaining effects of the second embodiment are similar to those of the aforementioned first embodiment.

An experiment conducted for confirming influence by the thickness of the charge outflow inhibition film according to the aforementioned second embodiment will be now described. In this experiment, in order to confirm the influence by the thickness of the charge outflow inhibition film, an electret device according to a sample 9, constituted by forming an electret film having a thickness of 1 μm, and electret devices according to samples 10 to 16, each constituted by forming a charge outflow inhibition film having a thickness of 0.1 μm to 1.2 μm on an upper surface of an electret film having a thickness of 1 μm were prepared. In the samples 9 to 16, $SiO_2$ formed by thermal oxidation was employed as the electret films. In the samples 10 to 16, SiOC formed by PE-CVD was employed as the charge outflow inhibition films. The electret films and the charge outflow inhibition films of the samples 9 to 16 were not patterned. Charge injection was performed with respect to the prepared samples 9 to 16, and the surface potentials of the samples 9 to 16 to which the charge injection was performed were measured. Results thereof are shown in FIG. 10.

Figure 10:
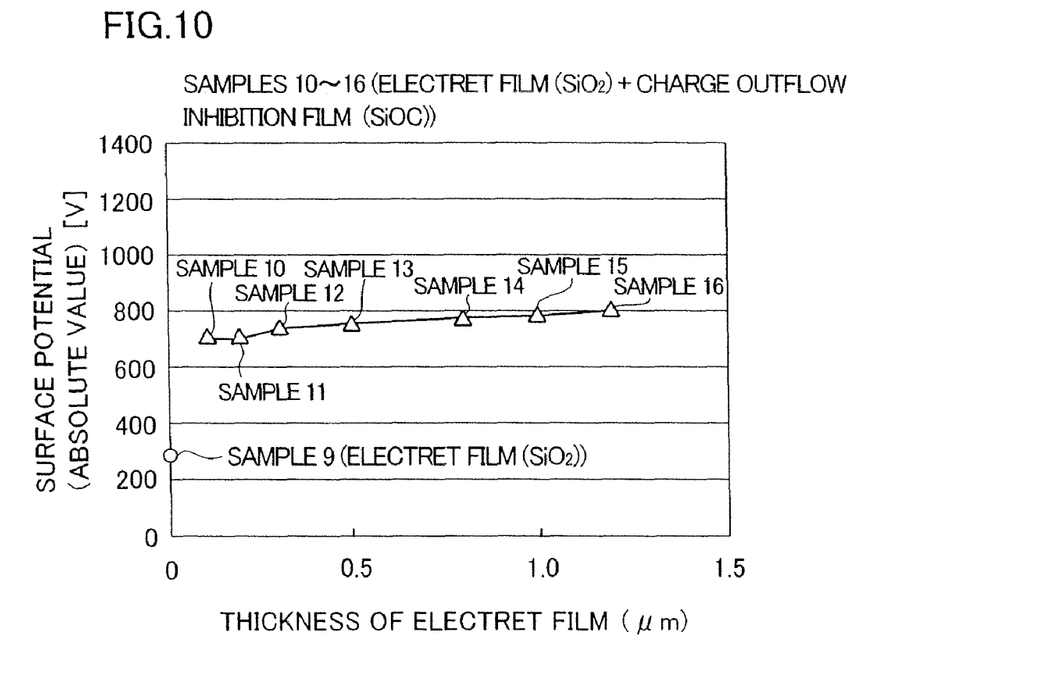
FIG. 10 is a graph showing the relation between thicknesses of charge outflow inhibition films and the surface potentials.

From the measurement results shown in FIG. 10, the surface potential of the electret device with no charge outflow inhibition film according to the sample 9 was about −292 V, the surface potentials of the electret devices according to the samples 10, 11, 12, 13, 14, 15 and 16 employing the charge outflow inhibition films having thicknesses of 0.1 μm, 0.2 μm, 0.3 μm, 0.5 μm, 0.8 μm, 1 μm and 1.2 μm were about −709 V, about −712 V, about −741 V, about −753 V, about −774 V, about −785 V and about −806 V respectively. It has been proved from the aforementioned measurement results that increase in the thickness of the charge outflow inhibition film increases the surface potential of the electret device in the structure where the charge outflow inhibition film is formed on the upper surface of the electret film. Therefore, according to the aforementioned second embodiment, the charge outflow inhibition film 3a including projecting portions 31 having the thickness t1 and the recess portions 32 having the thickness t2 smaller than the thickness t1 is formed on the upper surface of the electret film 2a, whereby the charge density of each region 21a of the electret film 2a corresponding to the projecting portion 31 can be increased as compared with the charge density of each region 22a corresponding to the recess portion 32.

Third Embodiment

Figure 11:
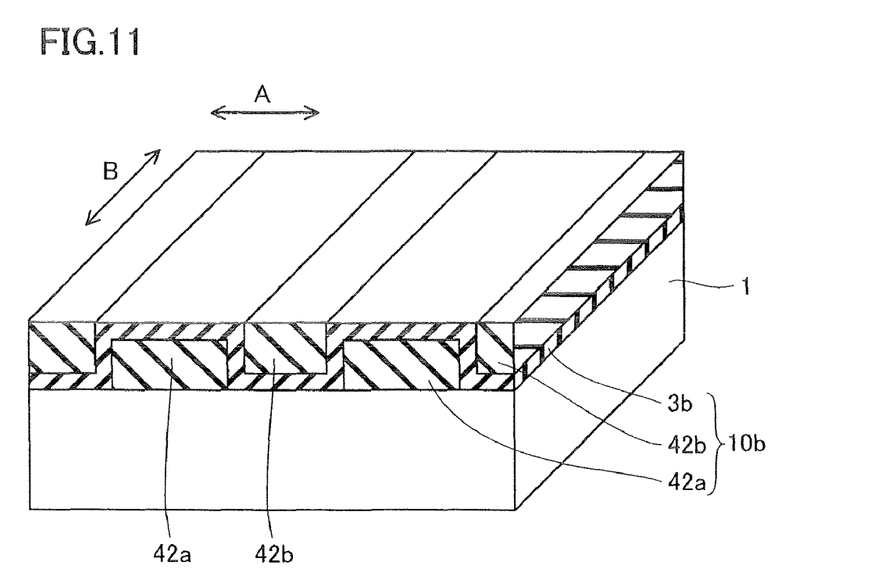
FIG. 11 is a perspective view showing a structure of an electret device according to a third embodiment of the present invention.
Figure 12:
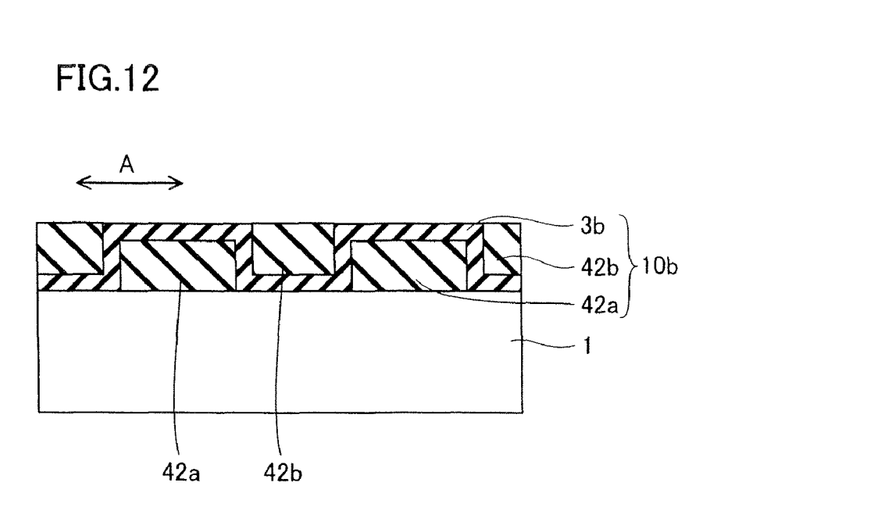
FIG. 12 is a sectional view showing the structure of the electret device according to the third embodiment shown in FIG. 11.

Referring to FIGS. 11 and 12, in an electret device 10b according to a third embodiment, electret films 42a and 42b are isolated with a charge outflow inhibition film 3b, dissimilarly to the electret devices according to the aforementioned first and second devices.

The electret device 10b according to the third embodiment is formed on an upper surface of a substrate 1 made of glass having a thickness of about 300 μm to about 1000 μm, as shown in FIGS. 11 and 12. This electret device 10b is constituted by the electret films 42a and 42b and the charge outflow inhibition film 3b for inhibiting charges stored in the electret films 42a from flowing out.

According to the third embodiment, a plurality of the electret films 42a of the electret device 10b are formed on the upper surface of the substrate 1 at prescribed intervals along arrow A. Each of the electret films 42a is so formed as to extend along arrow B. Each electret film 42a consists of $SiO_2$, has a thickness of about 0.1 μm to about 100 μm, and has a high charge density. Each electret film 42a is an example of the "high charge density region" in the present invention.

According to the third embodiment, the charge outflow inhibition film 3b is so formed on the upper surface of the substrate 1 as to cover the electret films 42a. The charge outflow inhibition film 3b consists of MSQ or SiOC and has a thickness of about 0.01 μm to about 10 μm. A plurality of the electret films 42b are formed between the electret films 42a at prescribed intervals along arrow A on an upper surface of the charge outflow inhibition film 3b. Each electret film 42b is so formed as to extend along arrow B, and an upper surface of each electret film 42b and the upper surface of the charge outflow inhibition film 3b are substantially aligned with each other. Each electret film 42b consists of $SiO_2$ and has a low charge density. The electret film 42b is an example of the "low charge density region" in the present invention.

A manufacturing process of the electret device 10b according to the third embodiment of the present invention will be described with reference to FIG. 12.

First, a $SiO_2$ film is formed on the upper surface of the substrate 1 by thermal oxidation and thereafter the patterned electret films 42a of $SiO_2$ as shown in FIG. 12 are formed by photolithography and etching. Thereafter, the charge outflow inhibition film 3b of MSQ or SiOC is so formed on the upper surface of the substrate 1 as to cover the electret films 42a. In the case of forming the charge outflow inhibition film 3b of MSQ, spin coating is employed, while in the case of forming the charge outflow inhibition film 3b of SiOC, PE-CVD is employed. An $SiO_2$ film is so formed as to cover an overall upper surface of the charge outflow inhibition film 3b and thereafter excess portions of the $SiO_2$ film are polished by CMP (chemical mechanical polishing), thereby flattening the $SiO_2$ film. Thus, the electret films 42b as shown in FIG. 12 are formed.

Then charges are injected into the electret films 42a and 42b. After injection of the charges, the charges injected into the electret films 42a are stored, while the charges injected into the electret films 42b flow out. The charge outflow inhibition film 3b formed on side surfaces of the electret films 42a inhibits the charges injected into the electret films 42a from flowing out into the electret films 42b. Thus, the electret film 42a each have a high charge density and the electret films 42b each have a low charge density as shown in FIG. 12.

According to the third embodiment, as hereinabove described, the charge outflow inhibition film 3b so formed as to cover not only the upper surfaces of the electret films 42a but also the side surfaces thereof is provided, whereby charges can be inhibited from flowing out from not only the upper surfaces of the electret films 42a but also the side surfaces thereof. Thus, the charge density of each electret film 42a can be further increased.

The remaining effects of the third embodiment are similar to those of the aforementioned first embodiment.

Fourth Embodiment

Figure 13:
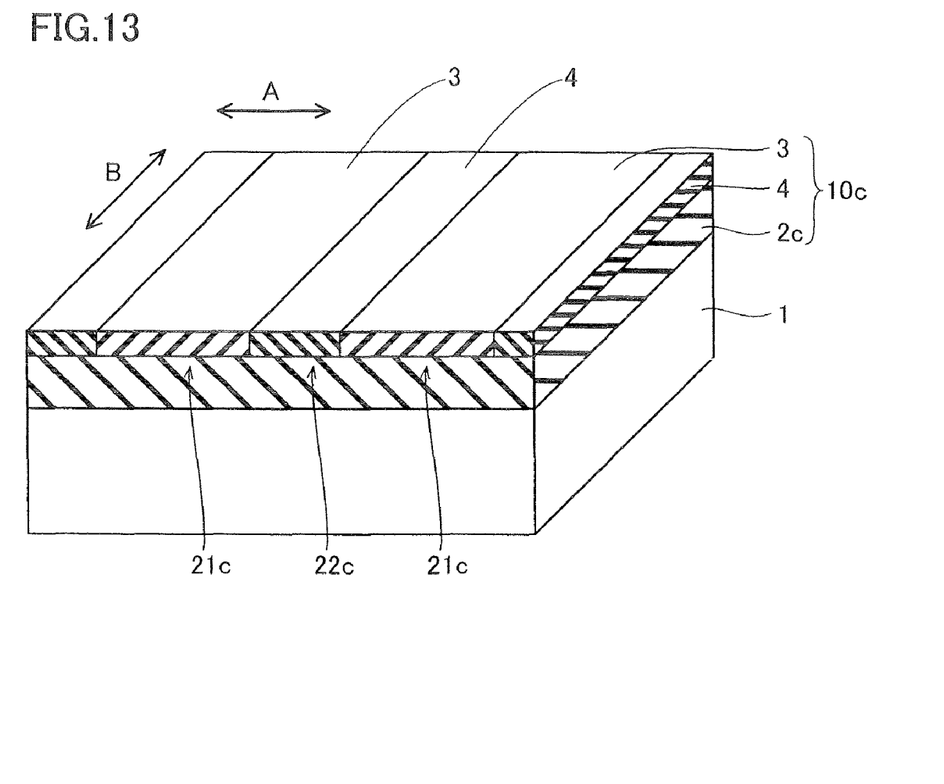
FIG. 13 is a perspective view showing a structure of an electret device according to a fourth embodiment of the present invention.
Figure 14:
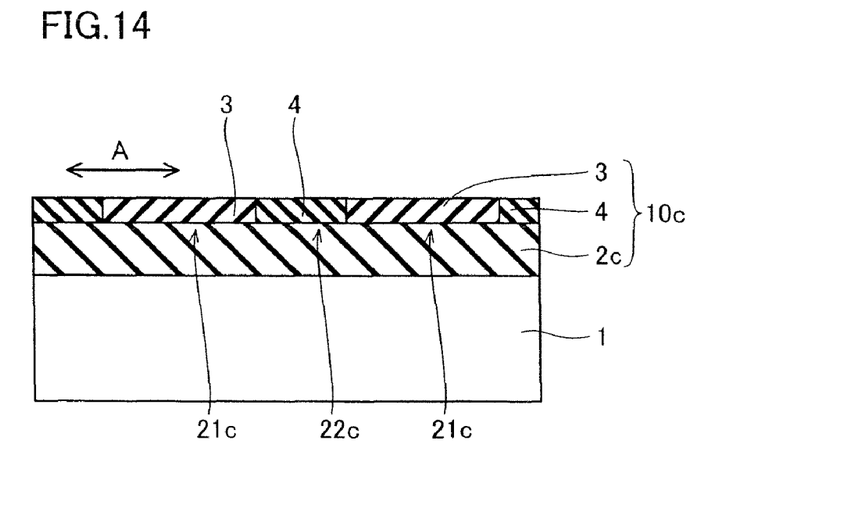
FIG. 14 is a sectional view showing the structure of the electret device according to the fourth embodiment shown in FIG. 13.

Referring to FIGS. 13 and 14, an electret device 10c according to a fourth embodiment comprises charge outflow promotion films 4, dissimilarly to the electret devices according to the aforementioned first to third embodiments.

The electret device 10c according to the fourth embodiment is formed on an upper surface of a substrate 1 made of glass having a thickness of about 300 μm to about 1000 μm as shown in FIGS. 13 and 14. The electret device 10c is constituted by an electret film 2c, charge outflow inhibition films 3 for inhibiting charges stored in the electret film 2c from flowing out, and charge outflow promotion films 4 for promoting outflow of charges stored in the electret film 2c.

According to the fourth embodiment, a plurality of the charge outflow promotion films 4 of the electret device 10c are formed between the charge outflow inhibition films 3 at prescribed intervals along arrow A on an upper surface of the electret film 2c of $SiO_2$ having a thickness of about 0.1 μm to about 100 μm. Each of the charge outflow promotion films 4 is so formed as to extend along arrow B. Each charge outflow promotion film 4 consists of SiN and has a thickness of about 0.01 μm to about 10 μm. Each charge outflow promotion film 4 is so formed as to have a thickness substantially similar to that of each charge outflow inhibition film 3.

According to the fourth embodiment, regions 21c of the electret film 2c, located under regions where the charge outflow inhibition films 3 are formed, each have a high charge density, while regions 22c of the electret film 2c, located under regions where the charge outflow promotion films 4 are formed, each have a low charge density. The regions 21c and 22c are examples of the "high charge density region" and "low charge density region" in the present invention respectively.

A manufacturing process of the electret device 10c according to the fourth embodiment of the present invention will be described with reference to FIGS. 2 and 14.

First, the patterned charge outflow inhibition films 3 as shown in FIG. 2 are formed similarly to that according to the aforementioned first embodiment. Then an SiN film is formed by LP-CVD (low pressure chemical vapor deposition) or PE-CVD. Thereafter excess portions of the SiN film are polished by CMP or the like, thereby flattening the SiN film so as to expose upper surfaces of the charge outflow inhibition films 3. Thus, the charge outflow promotion films 4 of SiN shown in FIG. 14 are formed.

Then charges are injected into the electret films 2c. After injection of the charges, the charges injected into the regions 21c located under the regions where the charge outflow inhibition films 3 are formed are stored, while the charges injected into the regions 22c located under the regions where the charge outflow promotion films 4 are formed flow out. Thus, the regions 21c each have a high charge density, while the regions 22c each have a low charge density, as shown in FIG. 14.

According to the fourth embodiment, as hereinabove described, the charge outflow promotion films 4 promoting the outflow of the charges stored in the electret film 2c are provided on the upper surface of the electret film 2c, whereby the charges injected into the regions under the regions where the outflow promotion films 4 are formed can be more likely to flow out and hence the regions 22c each having a lower charge density can be formed under the regions where the charge outflow promotion films 4 are formed. Thus, the electret device 10c having larger difference between charge densities can be obtained.

The remaining effects of the fourth embodiment are similar to those of the aforementioned first embodiment.

An experiment conducted for confirming the effect of the charge outflow promotion films according to the aforementioned fourth embodiment will be now described. In this experiment, the following samples 17 to 21 were prepared. More specifically, in order to confirm the charge outflow promoting effect of the charge outflow promotion films, an electret device according to the sample 17, constituted by forming charge outflow promotion films of SiN each having a thickness of 0.02 μm on an upper surface of an electret film of $SiO_2$ having a thickness of 0.5 μm, and an electret device according to the sample 20, constituted by forming charge outflow inhibition films of SiN each having a thickness of 1.5 μm on an upper surface of an electret film of $SiO_2$ having a thickness of 0.5 μm were prepared. The sample 18 constituted by an electret film of $SiO_2$ having a thickness of 0.5 μm was prepared. The sample 19 constituted by a charge outflow promotion film of SiN having a thickness of 2.5 μm and the sample 21 constituted by a charge outflow promotion film of SiN having a thickness of 1 μm were prepared. The electret films and the charge outflow inhibition films of the samples 17 to 21 were not patterned. The charge outflow promotion films consisting of SiN of the samples 17 and 19 were formed by LP-CVD, the charge outflow promotion films consisting of SiN of the samples 20 and 21 were formed by PE-CVD. The electret films consisting of $SiO_2$ of the samples 17, 18 and 20 were formed by thermal oxidation. Charge injection was performed with respect to the prepared samples 17 to 21, and variation with time of the surface potentials of the samples 17 to 21 to which the charge injection was performed was measured. Results thereof are shown in FIGS. 15 and 16.

Figure 15:
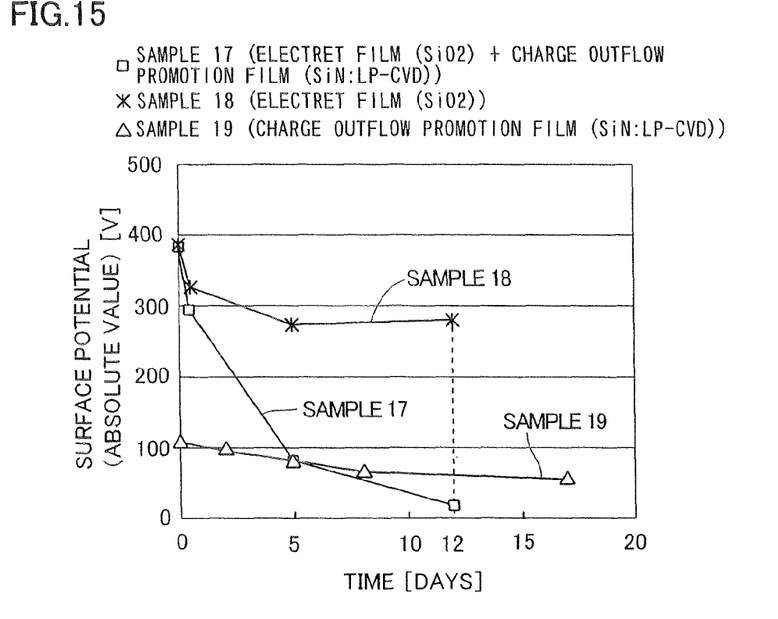
FIG. 15 is a graph showing the relation between surface potentials and times in samples 17 to 19.

From the measurement results shown in FIG. 15, after a lapse of 12 days, the surface potential of the electret device according to the sample 17, constituted by forming the charge outflow promotion films of SiN on the upper surface of the electret film of $SiO_2$ by LP-CVD was about −19 V. After a lapse of 12 days, the surface potential of the sample 18, constituted by the electret film of $SiO_2$ was about −279 V, and the surface potential of the sample 19, constituted by the charge outflow promotion film of SiN formed by LP-CVD was about −60 V.

Figure 16:
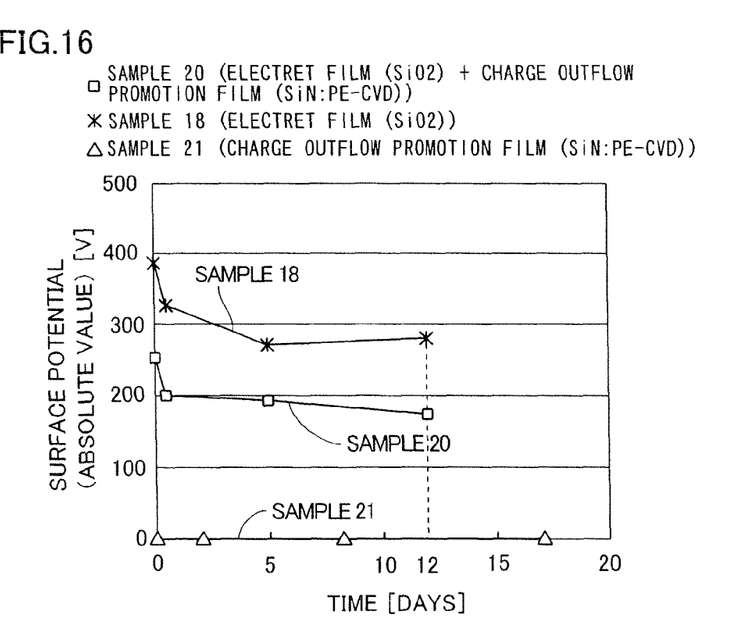
FIG. 16 is a graph showing the relation between surface potentials and times in samples 18, 20 and 21.

From the measurement results shown in FIG. 16, after a lapse of 12 days, the surface potential of the electret device according to the sample 20, constituted by forming the charge outflow promotion films of SiN on the upper surface of the electret film of $SiO_2$ by PE-CVD was about −175V. After a lapse of 12 days, the surface potential of the sample 18 constituted by the electret film of $SiO_2$ was about −279 V, and the surface potential of the sample 21 constituted by the charge outflow promotion film of SiN formed by PE-CVD was about 0 V.

It has been proved from the aforementioned measurement results that the surface potential of the electret device is decreased by forming the charge outflow promotion films on the upper surface of the electret film as in the samples 17 and 20. This is conceivably because the charge outflow promotion films formed on the upper surface of the electret film promote outflow of charges injected into the electret film. Therefore, according to the aforementioned fourth embodiment the charge outflow promotion films 4 are formed between the charge outflow inhibition films 3 on the upper surface of the electret film 2c, whereby the charge density of each region 22c of the electret film 2c having a low charge density can be reduced as compared with the charge density of each region 22 of the electret film 2 having a low charge density according to the aforementioned first embodiment. Thus, difference between the charge densities of the regions 21c and 22c of the electret film 2c can be further increased.

Figure 17:
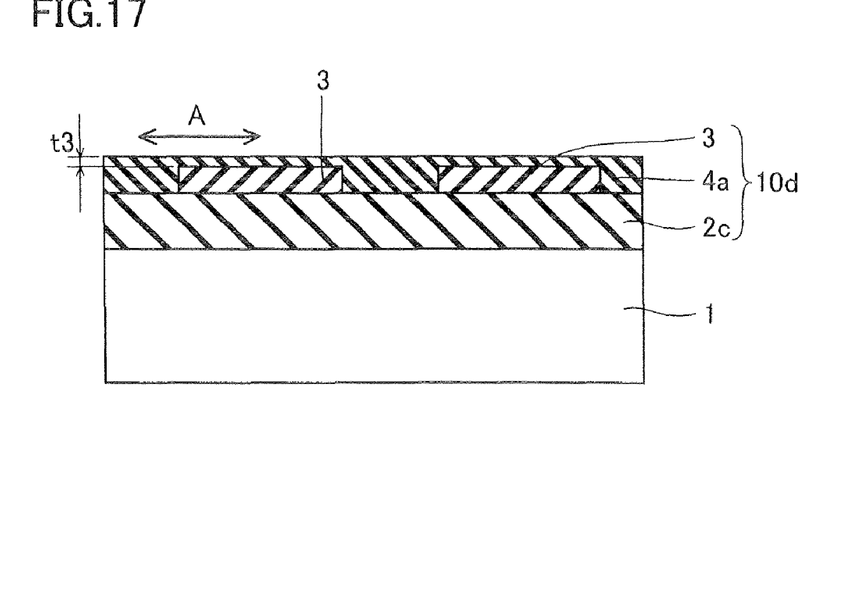
FIG. 17 is a sectional view showing a structure of an electret device according to a first modification of the fourth embodiment.

Referring to FIG. 17, in an electret device 10d according to a first modification of the fourth embodiment, the charge outflow inhibition films 3 are covered with a charge outflow promotion film 4a of SiN dissimilarly to the fourth embodiment shown in FIG. 14. The charge outflow promotion film 4a on the upper surfaces of the charge outflow inhibition films 3 has a thickness t3 of about 0.01 µm to about 1 µm.

According to the first modification of the fourth embodiment, as hereinabove described, the charge outflow promotion film 4a is so formed on the upper surface of the electret film 2c as to cover the charge outflow inhibition films 3, whereby a flattening step for exposing the upper surfaces of the charge outflow inhibition films 3 can be omitted.

The remaining effects of the first modification of the fourth embodiment are similar to those of the aforementioned fourth embodiment.

Figure 18:
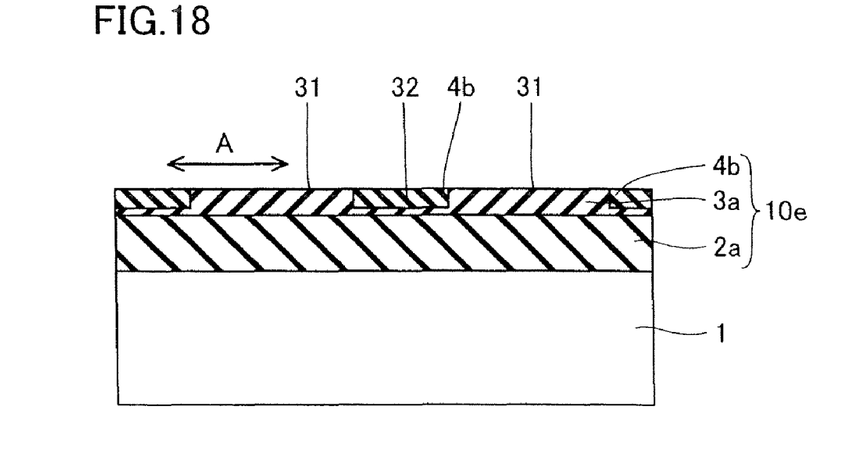
FIG. 18 is a sectional view showing a structure of an electret device according to a second modification of the fourth embodiment.

Referring to FIG. 18, in an electret device 10e according to a second modification of the fourth embodiment, charge outflow promotion films 4b of SiN are formed on recess portions 32 of a charge outflow inhibition film 3a of an electret device 10a according to the second embodiment dissimilarly to the fourth embodiment shown in FIG. 14. An upper surface of each charge outflow promotion film 4b and an upper surface of each projecting portion 31 of the charge outflow inhibition film 3a are substantially aligned with each other.

The remaining effects of the second modification of the fourth embodiment are similar to those of the aforementioned second and fourth embodiments.

Figure 19:
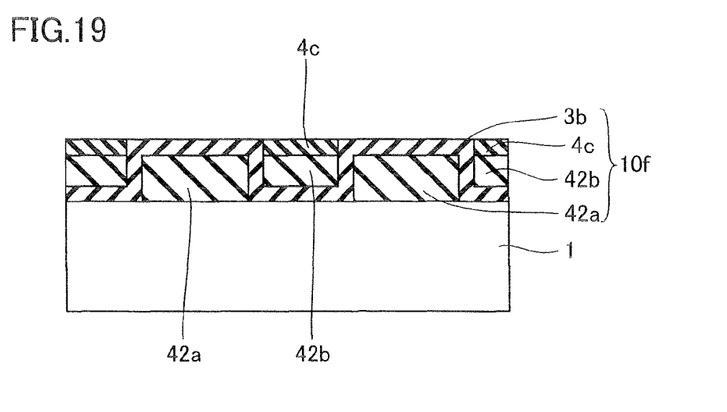
FIG. 19 is a sectional view showing a structure of an electret device according to a third modification of the fourth embodiment.

Referring to FIG. 19, in an electret device 10f according to a third modification of the fourth embodiment, charge outflow promotion films 4c of SiN are formed on electret films 42b of an electret device 10b according to the third embodiment dissimilarly to the fourth embodiment shown in FIG. 14. An upper surface of each charge outflow promotion film 4c and an upper surface of a charge outflow inhibition film 3b are substantially aligned with each other.

The remaining effects of the third modification of the fourth embodiment are similar to those of the aforementioned third and fourth embodiments.

Fifth Embodiment

A structure of an electrostatic induction generator 50 according to a fifth embodiment will be described with reference to FIG. 20. According to the fifth embodiment, the present invention is applied to the electrostatic induction generator 50, which is an exemplary electrostatic operating apparatus.

Figure 20:
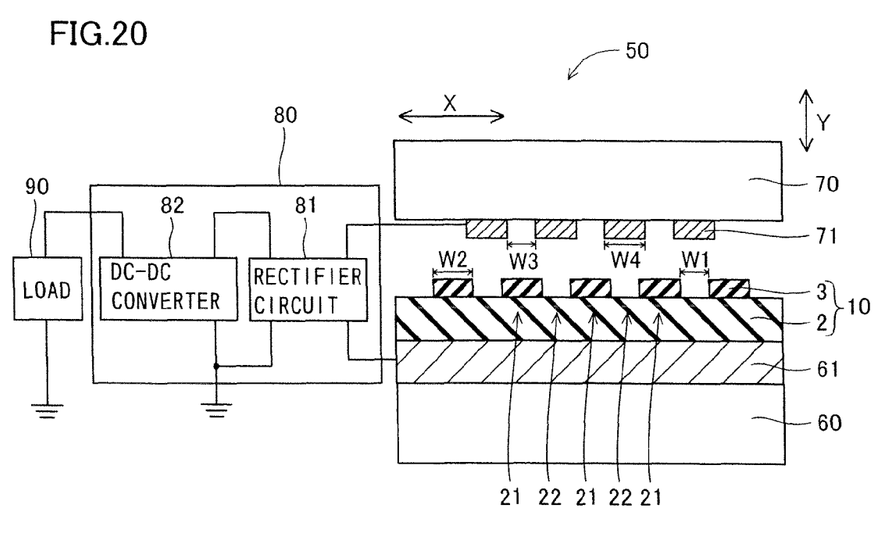
FIG. 20 is a schematic diagram of an electrostatic induction generator according to a fifth embodiment of the present invention.

The electrostatic induction generator 50 according to the fifth embodiment comprises a fixed substrate 60, a movable substrate 70 capable of moving with respect to the fixed substrate 60 and a circuit portion 80a shown in FIG. 20. A load 90 driven with the electrostatic induction generator 50 is connected to the electrostatic induction generator 50. This load 90 is grounded.

The fixed substrate 60 of the electrostatic induction generator 50 is made of glass having a thickness of about 300 µm to about 1000 µm. A fixed electrode 61 of Al having a thickness of about 0.05 µm to about 1 µm is formed on an upper surface closer to the movable substrate 70 of the fixed substrate 60. The circuit portion 80 is connected to the fixed electrode 61.

According to the fifth embodiment, an electret device 10 according to the first embodiment is formed on an upper surface of the fixed electrode 61. More specifically, an electret film 2 of SiO$_2$ having a thickness of about 0.1 µm to about 100 µm is formed on the upper surface of the fixed electrode 61. A plurality of the charge outflow inhibition films 3 are formed on an upper surface of the electret film 2 at prescribed intervals W1. Each charge outflow inhibition film 3 consists of MSQ or SiOC having a thickness of about 0.01 µm to about 10 µm and has a width W2. Regions 21 located under regions of the electret film 2, where the charge outflow inhibition films 3 are formed, each have a high charge density, while regions 22 of the electret film 2, located under regions where the charge outflow inhibition films 3 are formed, each have a low charge density.

The movable substrate 70 of the electrostatic induction generator 50 is made of glass having a thickness of about 300 µm to about 1000 µm. Movable electrodes 71 are formed on an upper surface closer to the fixed substrate 60 of the movable substrate 70 at prescribed intervals W3 smaller than the width W2 of the charge outflow inhibition films 3. Each movable electrode 71 consists of Al having a thickness of about 0.05 µm to about 1 µm and has a width W4. The circuit portion 80 is connected to the movable electrodes 71.

The circuit portion 80 includes a rectifier circuit 81 for rectifying power generated, a DC-DC converter 82 for converting a voltage level of a direct current rectified with the rectifier circuit 81. The rectifier circuit 81 is connected to the fixed electrode 61 and the movable electrodes 71, and also connected to the DC-DC converter 82. The load 90 driven through power generated with the electrostatic induction generator 50 is connected to the DC-DC converter 82. The DC-DC converter 82 is grounded.

A power generating operation of the electrostatic induction generator 50 according to the fifth embodiment of the present invention will be now descried with reference to FIG. 20.

When vibration is not applied to the electrostatic induction generator 50, the regions 21 of the electret film 2 each having a high negative charge density and the movable electrodes 71 are so arranged as to be opposed to each other at a prescribed interval and hence positive charges are stored in the movable electrodes 71 by electrostatic induction.

As shown in FIG. 20, the movable electrodes 71 move in a direction X resulting from vibration applied to the electrostatic induction generator 50 in a horizontal direction (direction X), whereby the movable electrodes 71 move to positions opposed to the regions 22 of the electret film 2 each having a low negative charge density. Thus, the potential of a region opposed to each movable electrode 71 is changed from a low potential to a high potential, and hence the amount of charges stored in the movable electrodes 71 by electrostatic induction is changed. This changed charges become current, which is outputted to the load 90 through the rectifier circuit 81 and the DC-DC converter 82. The movable electrodes 71 repeat the aforementioned operation by vibration in the direction X, whereby power is continuously generated.

According to the fifth embodiment, as hereinabove described, the electret device 10 including the electret film 2 and the charge outflow inhibition films 3 is provided, whereby the electret device 10 having the regions 21 each having a high charge density and the regions 22 each having a low charge density due to the charge outflow inhibition films 3 and having large difference in the charge densities can be employed and hence power generation efficiency of the electrostatic induction generator 50 can be improved.

According to the fifth embodiment, the movable electrodes 71 are formed at the prescribed intervals W3 smaller than the width W2 of the charge outflow inhibition films 3, whereby the electret film 2 and the movable electrodes 71 can be inhibited from coming into contact with each other also when the movable substrate 70 moves in a direction Y with respect to the fixed substrate 60. Thus, the electrostatic induction generator 50 can be inhibited from a short circuit.

Although the present invention has been described and illustrated in detail, it is clearly understood that the same is by way of illustration and example only and is not to be taken by way of limitation, the spirit and scope of the present invention being limited only by the terms of the appended claims.

For example, while the electret film of $SiO_2$ is employed in the aforementioned first to the fourth embodiments, the present invention is not restricted to this but an electret film consisting of Teflon (registered trademark) or polytetrafluoroethylene (PTFE) may alternatively be employed.

While the upper surfaces of the electret films 42b and the upper surfaces of the charge outflow inhibition film 3b are aligned with each other in the aforementioned third embodiment, the present invention is not restricted to this but the upper surfaces of the electret films 42b may alternatively be higher or lower than the upper surfaces of the charge outflow inhibition film 3b.

While overall regions of the charge outflow inhibition film 3b have the same thickness in the aforementioned third embodiment, the present invention is not restricted to this but the thickness of the charge outflow inhibition film 3b formed on the upper surfaces of the electret films 42a may alternatively be larger than the thickness of the charge outflow inhibition film 3b formed on the side surfaces of the electret films 42a.

While the charge outflow promotion films 4 are formed after forming the charge outflow inhibition films 3 in the aforementioned fourth embodiment, the present invention is not restricted to this but the charge outflow inhibition films 3 may be formed after forming the charge outflow promotion films 4.

While the thickness of each charge outflow promotion film 4 is substantially identical with that of each charge outflow inhibition film 3 in the aforementioned fourth embodiment, the present invention is not restricted to this but the thickness of each charge outflow promotion film 4 may alternatively be larger or smaller than that of each charge outflow inhibition film 3.

While the upper surfaces of the charge outflow promotion films 4b and the upper surfaces of the projecting portions 31 of the charge outflow inhibition film 3a are substantially aligned with each other in the aforementioned second modification of the fourth embodiment, the present invention is not restricted to this but the upper surfaces of the charge outflow promotion films 4b may be alternatively be higher or lower than the upper surfaces of the projecting portions 31 of the charge outflow inhibition film 3a. Alternatively, the charge outflow promotion films 4b may be cover the upper surface of the projecting portions 31 of the charge outflow inhibition film 3a.

While the upper surfaces of the charge outflow promotion films 4c and the upper surface of the charge outflow inhibition film 3b are substantially aligned with each other in the aforementioned third modification of the fourth embodiment, the present invention is not restricted to this but the upper surfaces of the charge outflow promotion films 4c may alternatively be higher or lower than the upper surface of the charge outflow inhibition film 3b. Alternatively, the charge outflow promotion films 4c may be cover the upper surface of the charge outflow inhibition film 3b.

While the electrostatic induction generator 50 as an exemplary electrostatic operating apparatus is shown in the aforementioned fifth embodiment, the present invention is not restricted to this but the present invention is also applicable to other electrostatic operating apparatus such as an actuator of an electrostatic induction type so far as the electrostatic operating apparatus including an electret device.

While the electret device 10 according to the first embodiment is provided on the fixed substrate 60 in the aforementioned fifth embodiment, the present invention is not restricted to this but an electret device according to each of the second to fourth embodiment may alternatively be provided on the fixed substrate.

While the fixed electrode 61, the electret film 2 and the charge outflow inhibition films 3 are formed on the fixed substrate 60 and the movable electrodes 71 are formed on the movable substrate 70 in the aforementioned fifth embodiment, the present invention is not restricted to this but the movable electrodes may be formed on the fixed substrate, while the movable electrode, the electret film and the charge outflow inhibition films may be formed on the movable substrate.

While the movable electrodes 71 are formed at prescribed intervals W3 smaller than the width W2 of the charge outflow inhibition films 3 in the aforementioned fifth embodiment, the present invention is not restricted to this but the movable electrodes 71 may be formed to have the interval W1 lager than the width W4 of the movable electrodes 71 instead of forming the movable electrodes 71 at the prescribed interval W3 smaller than the width W2 of the charge outflow inhibition films 3.

Figure 21:
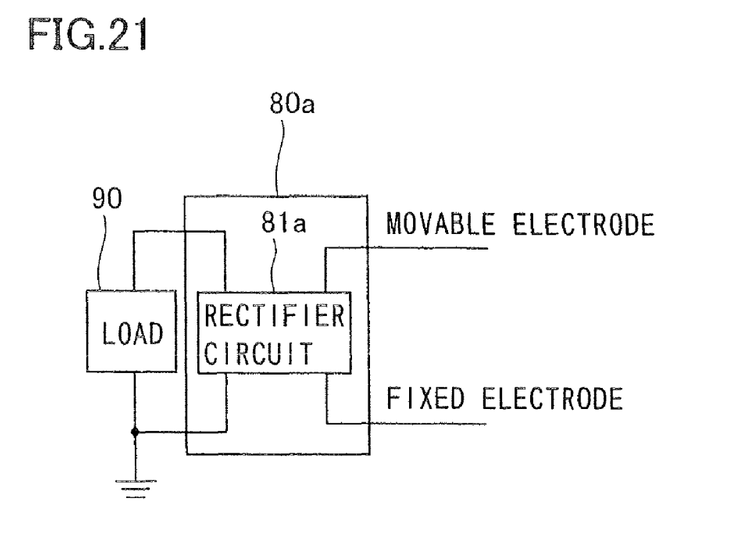
FIG. 21 is a schematic diagram of a circuit portion of an electrostatic induction generator according to a first modification of the fifth embodiment.
Figure 22:
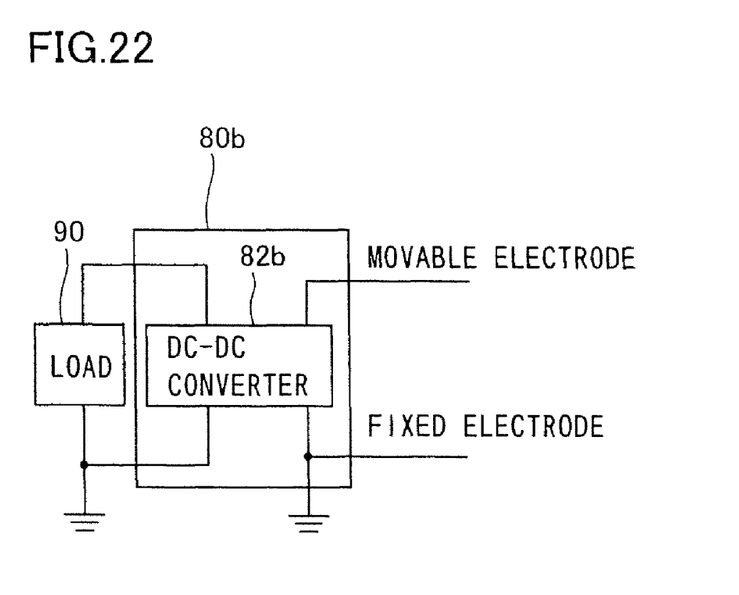
FIG. 22 is a schematic diagram of a circuit portion of an electrostatic induction generator according to a second modification of the fifth embodiment.

While the circuit portion 80 including the rectifier circuit 81 and the DC-DC converter 82 is provided in the aforementioned fifth embodiment, the present invention is not restricted to this but a circuit portion 80a according to a first embodiment of the fifth embodiment shown in FIG. 21 may be alternatively provided. This circuit portion 80a includes a rectifier circuit 81a. The rectifier circuit 81a is connected to a movable electrode and a fixed electrode, while being connected to a load 90. A circuit portion 80b according to a second modification of the fifth embodiment shown in FIG. 22 may be alternatively provided. This circuit portion 80b includes a DC-DC converter 82b. The DC-DC converter 82b is connected to a counter electrode and a fixed electrode, while being connected to a load 90. The DC-DC converter 82b is grounded.

What is claimed is:

1. An electret device comprising:
an electret film capable of storing charges; and
a charge outflow inhibition film formed at least on an upper surface of a high charge density region of said electret film and inhibiting the charges stored in said electret film from flowing out, wherein
said charge outflow inhibition film includes a first charge outflow inhibition portion formed on said upper surface of said high charge density region of said electret film and having a first thickness and a second charge outflow inhibition portion formed on an upper surface of a low charge density region of said electret film and having a second thickness smaller than said first thickness of said first charge outflow inhibition portion.

2. The electret device according to claim 1, wherein said charge outflow inhibition film is so formed as to cover not only said upper surface of said high charge density region of said electret film but also side surfaces thereof.

3. The electret device according to claim 1, wherein said charge outflow inhibition film consists of SiOC or MSQ.

4. An electrostatic operating apparatus comprising:
a fixed electrode;
a movable electrode capable of moving with respect to said fixed electrode, so provided as to be opposed to said fixed electrode at a prescribed distance;
an electret device formed on an upper surface of either said fixed electrode or said movable electrode, and including an electret film capable of storing charges and a charge outflow inhibition film formed at least on an upper surface of a high charge density region of said electret film and inhibiting the charges stored in said electret film from flowing out, wherein
said charge outflow inhibition film includes a first charge outflow inhibition portion formed on said upper surface of said high charge density region of said electret film and having a first thickness and a second charge outflow inhibition portion formed on an upper surface of a low charge density region of said electret film and having a second thickness smaller than said first thickness of said first charge outflow inhibition portion.

5. The electrostatic operating apparatus according to claim 4, wherein
said charge outflow inhibition film is so formed as to cover not only said upper surface of said high charge density region of said electret film but also side surfaces thereof.

6. The electrostatic operating apparatus according to claim 4, wherein said charge outflow inhibition film consists of SiOC or MSQ.

* * * * *